Dec. 11, 1923.　　　　　　　　　　　　　　　　　　　1,477,315
A. COMBAZ
EXHAUST SILENCER
Filed Feb. 16, 1920　　　3 Sheets-Sheet 1

Inventor
Alfred Combaz
By D.R. O'Neail
His Attorney.

Dec. 11, 1923.                    A. COMBAZ                    1,477,315
                              EXHAUST SILENCER
                     Filed Feb. 16, 1920      3 Sheets-Sheet 2
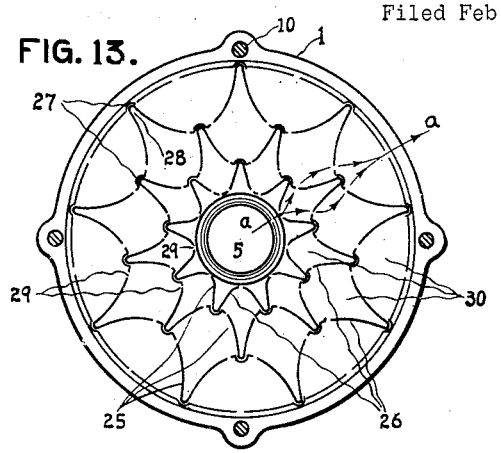
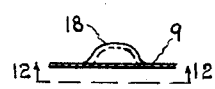
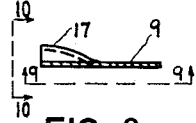
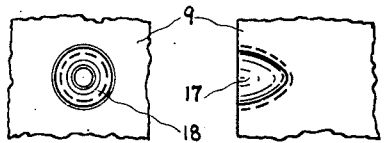
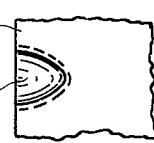
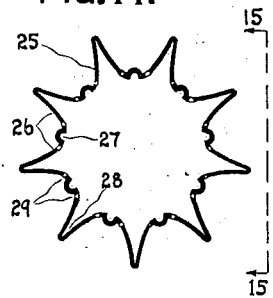
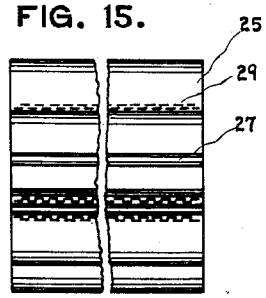
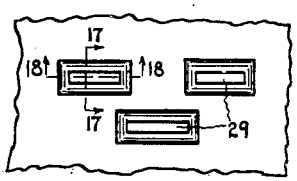
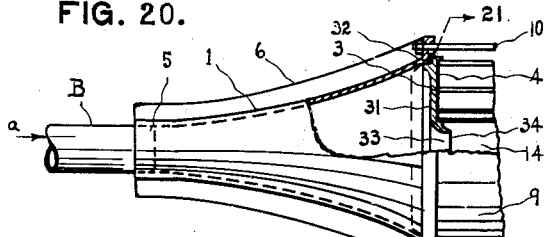
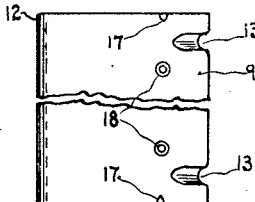
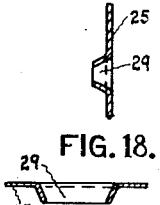
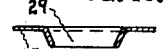
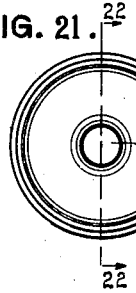
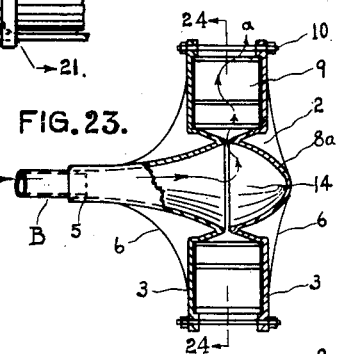
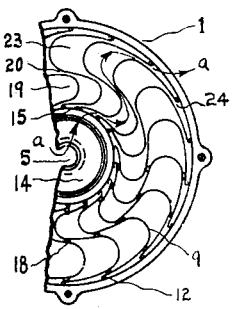
Inventor
Alfred Combaz
By D. R. Meail
His Attorney.

Dec. 11, 1923.
A. COMBAZ
1,477,315
EXHAUST SILENCER
Filed Feb. 16, 1920   3 Sheets-Sheet 3
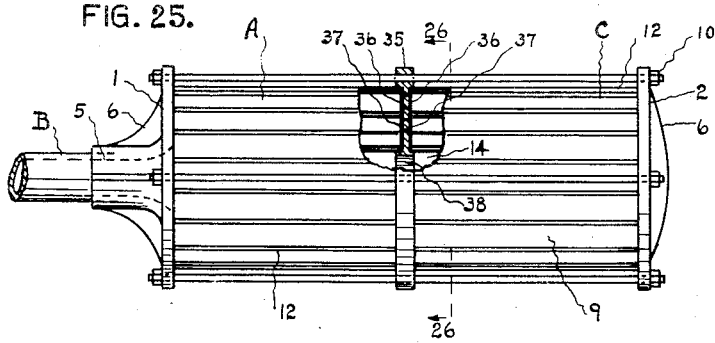
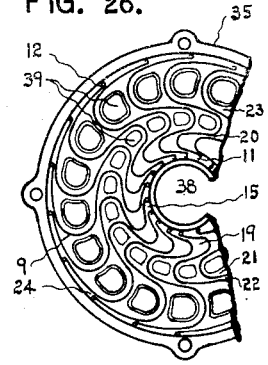
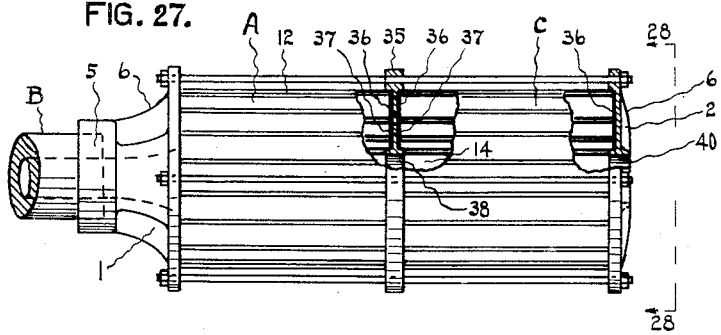
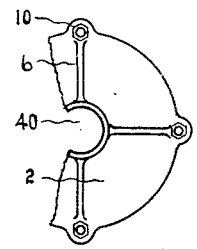
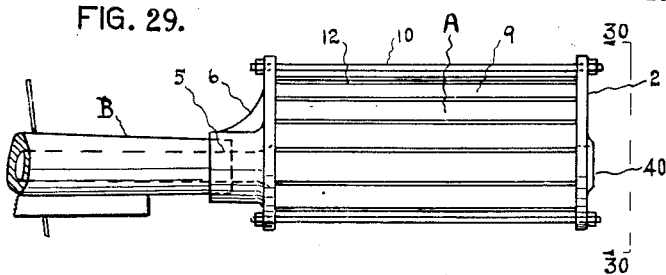
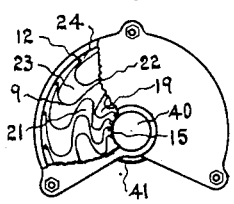
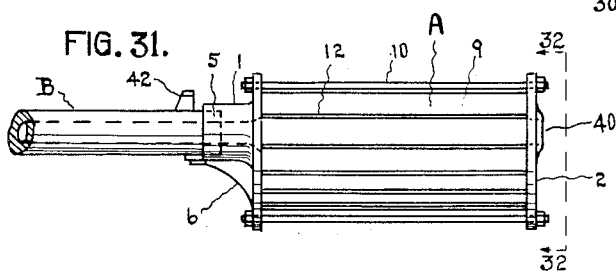
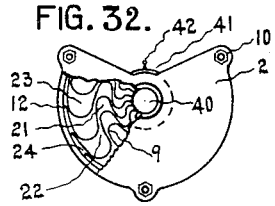

Patented Dec. 11, 1923.

1,477,315

UNITED STATES PATENT OFFICE.

ALFRED COMBAZ, OF ST. BONIFACE, MANITOBA, CANADA.

EXHAUST SILENCER.

Application filed February 16, 1920. Serial No. 358,945.

*To all whom it may concern:*

Be it known that I, ALFRED COMBAZ, subject of the King of Great Britain, residing in the city of St. Boniface, in the Province of Manitoba, in the Dominion of Canada, have invented certain new and useful Improvements in Exhaust Silencers, of which the following is a specification.

This invention relates to exhaust silencers or mufflers for internal combustion engines, guns or any apparatus discharging a fluid of initially higher pressure than the pressure of the receiving fluid.

The objects of the invention are, mainly, to obtain coupled in an exhaust-silencer:

1—An efficient muffling of the sound waves;

2—An attenuated back-pressure;

3—A positive blow-out proof structure;

4—Minimum volume and weight for a given efficiency in muffling;

5—Eliminating of clogging;

6—Economical manufacture.

With these and certain other objects in view, which will appear as the description proceeds, the invention resides in the novel features, arrangements and combination of parts first fully described in the following specification, and then more particularly pointed out in the appended claims, reference also being had to the drawings, forming part hereof and illustrating embodiments of the invention, in which similar characters of reference indicate similar parts throughout the different views.

In the drawings:

Fig. 8 is a sectional fragment of one of the blades showing the radial spacing member raised on the edge thereof;

Fig. 9 shows the blade fragment of Fig. 8 as viewed in the direction indicated by the line 9—9 in the said Fig. 8;

Fig. 10 is the fragment of blade shown in Fig. 8 viewed in the direction indicated by the line 10—10 in Fig. 8;

Fig. 11 is a fragment of one of the blades showing one of the intermediate spacing members raised thereon;

Fig. 12 is a view in the direction indicated by the line 12—12 in Fig. 11;

Fig. 13 is a somewhat diagrammatic view of a cross-section through a silencer in which the radial blades system of the device, as shown in Figs. 1 to 12 inclusive, has been departed from, and concentric members substituted therefor;

Fig. 14 is a diagrammatic view of one of the concentric members shown in Fig. 13;

Fig. 15 is the member shown in Fig. 14 as viewed in the direction indicated by the line 15—15 in the said Fig. 14;

Fig. 16 is a fragment of the member shown in Figs. 14 and 15, and enlarged to show the ports or nozzles therethrough;

Fig. 17 is a fragment of the portion shown in Fig. 16 on the line 17—17 therein;

Fig. 18 is a fragment of Fig. 16 on the line 18—18 therein;

Fig. 19 is a view of a blade showing the edge and intermediate spacing members raised thereon, and also the re-inforcing ribs stamped or pressed in from the surface thereof;

Fig. 20 shows a fragment of a silencer having a constant acceleration diverging inlet nozzle of amplified length used when the silencer is either directly or very closely connected with the engine;

Fig. 21 shows the diaphragm used between the inlet diverging nozzle and the blades in the structure shown in Fig. 20, the position of which is indicated by the line 21—21 in said Fig. 20;

Fig. 22 is a section taken on the line 22—22 in Fig. 21;

Fig. 23 shows the device as having a parabolic sound reflector adapted to receive and throw back the sound waves of the incoming gases;

Fig. 24 is a fragmentary section taken on line 24—24 of Fig. 23;

Fig. 25 shows the device doubled up in capacity by the joining together of two units;

Fig. 26 is a fragmentary section taken through the device substantially on the line 26—26 in Fig. 25 to show the intermediate head upon which the two units are joined;

Fig. 27 shows the device as it might be applied to a gun of large calibre;

Fig. 28 is a fragment showing the device of Fig. 27 as viewed in the direction indicated by the line 28—28 in said Fig. 27; the port in the rear head for the projectile exit being clearly shown therein;

Fig. 29 shows the device shaped to conform to the requirements of a gun having a long travel recoil absorption apparatus;

Fig. 30 is a view of Fig. 29 viewed in the direction indicated by the line 30—30 therein;

Fig. 31 is a view of the device as applicable to a rifle or other arm having upper sighting means;

Fig. 32 is a view of Fig. 31 in the direction indicated by the line 32—32 in Fig. 31.

Figures 1, 2, 3:
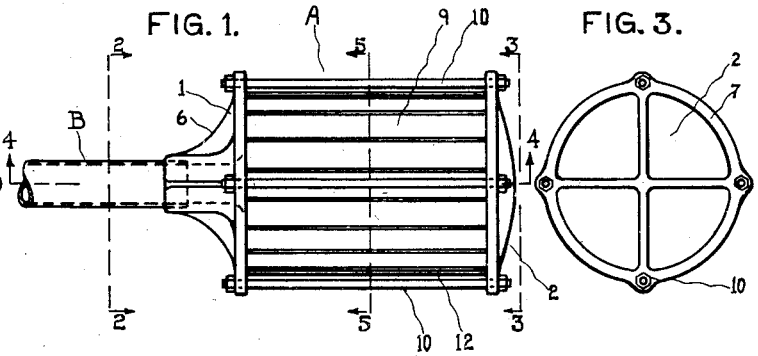
Fig. 1 is a longitudinal elevation of an engine exhaust muffler in which is embodied the invention, so much of the engine exhaust pipe being shown as is necessary to show the connection of the muffler therewith.
Fig. 2 shows the structure as viewed from the exhaust gases inlet end, in the direction indicated by the lines 2—2 in Fig. 1.
Fig. 3 shows the end of the structure viewed in the direction indicated by the lines 3—3 in Fig. 1.
Figure 4:
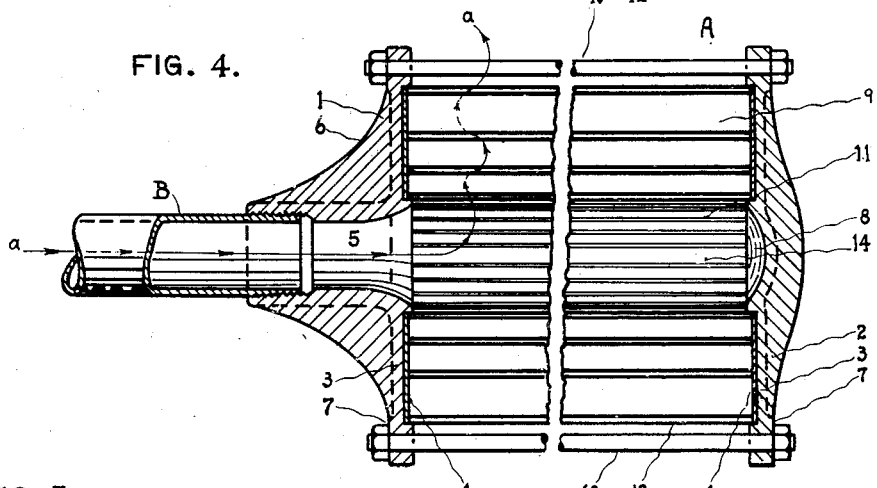
Fig. 4 is a section through the device substantially in the plane of line 4—4 in Fig. 1, but enlarged to more clearly show the construction.
Figure 5:
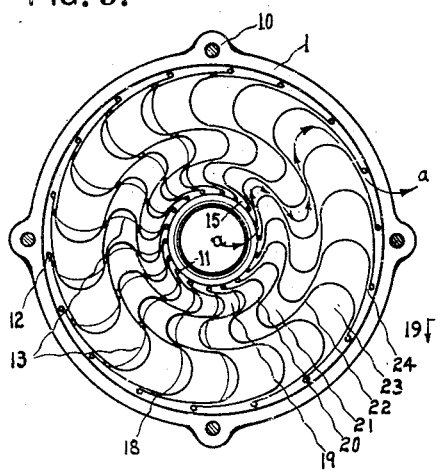
Fig. 5 is a cross-section through the device taken on line 5—5 in Fig. 1; the blades being shown diagrammatically.

The organs as shown in the drawings, and with special reference to Figs. 1 to 12 inclusive: A indicates the muffler or silencer as a whole, while B indicates the terminal of an engine exhaust pipe with which it is in screw threaded engagement.

The member A comprises the assembling inlet and rear heads 1 and 2 respectively, the heads being formed with an annular depression 3 on their inner faces to receive the annular gaskets 4, which are slightly less in thickness than the depth of the depressions 3 in which they are placed.

The inlet head 1 is formed with a constant acceleration diverging nozzle 5, connecting by its minor diameter end with the terminal of exhaust pipe B; the inlet head has on its outer surface a series of radial fins 6 and a circular fin 7. The rear head 2 is formed with, on its inner face, a central depression which may be a mere concave as shown at 8 in Fig. 2, or which may preferably be amplified to true parabolic form as is shown at 8ª in Fig. 23, the diameter of the open end of the depression 8 being equivalent, in either case, to the diameter of the inner open end, or major diameter of the inlet nozzle 5.

A plurality of radially positioned undulating blades 9 are clamped between the assembling heads 1 and 2 by means of the bolts 10, their edges, at both ends, being placed in the depressions 3 in the assembling heads whereby their concentric spacing to the inlet nozzle 5 is ensured. The undulating blades are stiffened in their longitudinal direction by their rolled inner and outer radial edges 11 and 12, and in radial direction by the incurvate beads 13 raised or stamped in on their surfaces.

As the undulating blades 9 do not extend inwardly beyond the inner limits of the depressions 3 they define thereby a central or distributing chamber 14 into which inlet nozzle 5 opens. The spacing of the undulating blades 9 defines uniform arcs of opening or initial ports 15, out from the said chamber 14, between each pair of adjacent undulating blades 9. The blades 9 are formed with curves or undulations 16 so shaped as to approach each other very closely on concentric lines, at fixed distances from the centre of the distributing chamber 14, and the undulating blades being formed with edge and intermediate bosses 17 and 18 respectively on their most closely adjacent surfaces, which by contact serve to maintain the spacing of the undulating blades 9.

The initial ports 15 open on the first annulus of expansion chambers or initial expansion chambers 19 which chambers communicate through the intermediate ports 20 with the next annulus of expansion chambers or intermediate expansion chambers 21. Through the intermediate ports 22 the chambers 21 communicate with the final expansion chambers 23, which are in communication with the atmosphere through the terminal ports 24. This being merely an indication of the extent to which the process of successive expansions may be carried.

In Figs. 13 to 18 inclusive a variation from the previous type of muffler is shown, in those star shaped members 25, one of which is shown separately in Fig. 14. The members 25 are assembled by sliding the larger over the smaller, the incurvations 26 in the said members being formed with grooves 27 to slidingly receive the points 28 of the next smaller member. The whole assembly of star-shaped concentric members 25 being clamped between the assembling inlet and rear heads 1 and 2, as previously described. The ports 29 formed on the surface of the members 25 permitting communication into the chambers 30 formed between the concentric members 25.

Figs. 20 to 22 inclusive illustrate a slight variation of the muffler adapting it to very close connection with an engine, the inlet nozzle 5 being enlarged to comprise the whole diameter of the head 1 and a diaphragm 31 seated on an annular gasket 32 being interposed to receive the ends of the undulating blades 9, the said diaphragm being formed with a central opening 33 having an outward nozzle 34 defining the entrance to the distributing chamber 14.

Figs. 25 and 26 illustrate a method of increasing the capacity of the muffler by the addition of unit of the same construction as that shown in Figs. 1 to 7 inclusive and indicated as C, the connection of the unit being made by means of an intermediate head or spacer 35 formed with depressions 36 on each side accommodating gaskets 37 on which the ends of the undulating blades 9 are seated. The spacer 35 necessarily provides means for the passage of the gases from one unit of construction to the other; these in the first instance comprising a central opening 38 and annular ports 39 which permit the free flow of the gases from the unit A to the additional unit C.

Figs. 27 and 28 show the application of the muffler to a gun of large calibre, an opening 40 being provided in the rear assembling head 2 for exit of a projectile.

Figs. 29 and 30 illustrate the adaptation of the device to a gun having a long travel recoil absorption apparatus, on the under side thereof, a certain number of undulating blades 9 being omitted and the gap filled by the addition of a re-inforced connecting member 41, which prevents the out flow of gases except through the terminal ports 24 between the blades 9.

Figs. 31 and 32 show the muffler as applied to a rifle or other form of gun having an upper sight 42, the gap between the blades 9 being closed by a connecting member 41.

In operation the muffler, as shown throughout the present drawings, works as follows:

In the case of a muffler, as illustrated in Figs. 1 to 7 inclusive, to be installed at the terminal of a well-proportioned exhaust pipe the exhaust gases single stream, following the path marked by arrow line a—a, immediately at its entrance in the muffler, is first slightly expanded within inlet diverging nozzle 5 and reaching the distributing chamber 14 is split up in many separate streamlets by the inner rolled edges 11 of the undulating blades 9. These separate streamlets passing through initial ports 15 flow into the first annulus of radial expansion chambers 19, and therefrom through each succeeding annulus of intermediate expansion chambers 21 to final expansion chambers 23 and from there to the atmosphere through the terminal ports 24.

In connection with the operation of the muffler as shown in Figs. 13 to 17 it should be noted, while the shape of the members 25 permits of cheaper manufacture than the previous type, and while the mode of operation is practically the same, the contours of the expanding chambers 30 are not so well adapted for a smooth flow of the gases as the contours of expansion chambers 19—21—23 in Figs. 1 to 7 inclusive.

From the foregoing description it will be understood that the main six objects of the invention are obtained as follows:

An efficient muffling is obtained by the practical application in the design of the present apparatus of the two following well known laws of acoustics: First, "That the intensity of the sound diminishes in the same ratio as the quantity of air set in motion augments"; second, "That as a sound wave bends around an obstacle it diffuses itself at the rear of the obstacle and thus becomes enfeebled in power, the obstacle thus producing a partial 'shadow' of the sound." Application of the first of the above laws is made by the provision in the present apparatus of a plurality of terminal ports, which, due to their long and narrow shape, increase for a given volume of exhaust gases their area of contact with the receiving atmosphere thereby setting in motion, but at a much reduced velocity, a large volume of air. The shape of the terminal ports also compels the issue of the exhaust gases in a plurality of ribbon-like streamlets, the form best calculated to be acted upon by the receiving atmosphere to effect an instantaneous cooling, and the consequent and instant drop in pressure results in a proportional attenuation of sound. The application of the second law, above cited, is made by the provision in the present apparatus of a plurality of undulating blades which compels each separate streamlet of exhaust gases to bend around each of the successive incurvations of the blades, thereby producing successive "shadows" of the sound. The muffling of the sound is further assisted by an initial expansion of the gases within a constant acceleration diverging inlet nozzle delivering the exhaust gases from the engine to the silencer. This initial expansion causing an immediate lateral diffusion of the sound waves, and carrying the "point-source" of the said waves as far distant as practical from the terminal ports.

An efficient muffling is further assisted by splitting up the initial exhaust gases single stream, immediately after its arrival into the silencer distributing chamber, into a plurality of streamlets, each of these flowing singly through a series of gradually larger expansion chambers to the atmosphere, in thus diminishing both volume and density of the exhaust gases, at a given point of discharge, that is at each terminal port, it diminishes thereby, and in equal ratio, the momentum of the discharging exhaust gases. It should be stated, also, that the longitudinal vibrations set up in the undulating blades are damped by the resilient gaskets of compressed asbestos on which their longitudinal ends are set, and the transverse vibrations are attenuated by the very shape of the undulating blades, and particularly by their inner and outer rolled tips. The vibrations set in the assembling heads are damped by the radial and circular fins formed thereon, and also by the pressure exerted at their extreme circular edges by the assembling bolts.

An attenuated back pressure is obtained in the present apparatus by an early and accelerated drop in pressure; by leading the expanding gases by the shortest route to the atmosphere; by offering no sharp bend or rough surface to the flowing gases; by the high "co-efficient of discharge" of the well shaped converging-diverging nozzles forming the intermediate ports, and the well-rounded orifices forming the initial and terminal ports; by the progression of port area between initial, intermediate, and terminal ports, which follows, in certain ratio, the progression of volume between initial, intermediate and terminal expansion chambers; by a total area of exit much larger than the area of inlet, all these features giving the least possible frictional resistance compatible with an efficient muffling.

A positively blow-out proof structure is obtained in the present apparatus through the swift expansion possible within the many and quickly reached expansion chambers; by the very large area of discharge promptly accessible to a sudden increase in volume of the exhaust gases stream; it should be noted, that, notwithstanding the fact that only thin gauge sheet iron is used in the making of the undulating blades, any sudden increase in pressure, caused by an unburnt charge igniting within the silencer, cannot blow out or distort the undulating blades, this being a function of the balanced pressure exerted on both sides of each undulating blade.

A minimum volume and weight for a given efficiency in muffling is obtained in the present apparatus through the accelerated expansion of the gases, and the very short way they have to flow to exit; the total travel of the gases being only a fraction of the total travel of the gases in ordinary exhaust silencers, at equal ratio of expansion. This feature permits therefore a smaller, and lighter construction for a given volume of exhaust gases to expand.

The elimination of clogging is obtained in the present apparatus by the swift, scouring motion of the gases in their constantly accelerated expansion, by the smoothness of the sheet iron walls of the undulating blades and by the comparatively very large area of each initial, intermediate and terminal ports.

The economical manufacture of the present apparatus is obtained through its comparatively small size; by the feasibility of making the undulating blades, which are the bulk of the construction, out of scrapped, short cuts of sheet iron; by the shape of the undulating blades which permits their manufacture by press, and the construction of robust dies for this purpose.

It may be noted here that the assembling heads can be easily cast of duralumin for aero-engines silencer, and, in that case, the radial fins formed on the inlet assembling head may be as many as possible so as to offer considerable radiating surface on the outer side of inlet nozzle, thus materially assisting in the pressure drop and in the stiffening of the inlet assembling head.

It may be noted, also, that in the application of the present apparatus to pieces of ordnance, that the sudden impact of the issuing column of gases will be divided up evenly between each initial port, and that the balanced pressure exerted by the expanding gases on both sides of the undulating blades will permit to keep the blade's thickness within practical limits. It may be further noted that in well designed application of the present apparatus to pieces of ordnance, beside attenuating to a bearable degree the stressing effects of the gun blast on the gunners' tympans it will have also two collateral effects: First, to attenuate that suction or aspiration on the atmosphere immediately at the rear of the gun, which aspiration is caused by the bulk of the discharging gases following a straight line of flow at their moment of discharge, and acting thereby as an air aspirator on the atmosphere in which are the gunners. The painful physiological effects caused by such atmospheric disturbance being well-known to artillery men, specially the "heavies" gunners. The use of the present apparatus will transform the gases line of flow from a longitudinal to a transversal one, therefore less disturbing on the atmosphere at the rear of gun. The second collateral effect of the application of the present apparatus to pieces of ordnance has but a purely military value; the flash instead of being fully visible will be nearly all screened by the muffler, such effect being particularly desirable during night firing. To sum up: The present apparatus demonstrates that an efficient muffling is not only, and necessarily, a function of increased volume of silencer coupled with a restricted outlet area, but rather a function of an immediate and accelerated drop in pressure coupled with much larger area of discharge, rapidly reached by the expanded gases through well-shaped ports. It will be understood that the invention is not limited to the precise forms and details of construction shown in the drawings, but that the same may be changed to suit different conditions of use.

Figure 6:
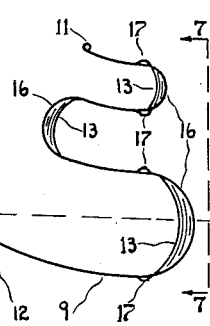
Fig. 6 shows one of the undulating blades apart from assembly.
Figure 7:
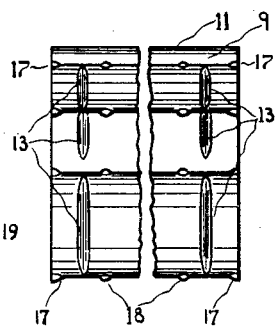
Fig. 7 is the blade as viewed in the direction indicated by the line 7—7 in Fig. 6.

It will be seen that the undulating blades such as shown in Fig. 6, are disposed, about the longitudinal axis of the silencer, in a general radial direction. It is true that these blades overlap but nevertheless it can be properly said that these blades are radially disposed as well as longitudinally. In the claims the expression, "radially disposed", is used, and this expression includes the idea that the inner radial edge of the blade, 11, is nearer the center of the silencer than the outer edge, 12, as is clearly illustrated in Fig. 6.

Having thus fully described my said invention what I claim is:

1. A silencer for use with internal combustion engines, guns and the like, comprising spaced heads, one having an inlet opening, leading into a central distributing chamber, spaced undulating blades between the heads, the said blades radiating from and longitudinally disposed relatively to the longitudinal axis of the silencer, and the said blades forming, between their inner terminals, ports to the central distributing chamber and, between their outer terminals, ports to the atmosphere the undulations forming alternately expansion chambers and nozzles.

2. A silencer for use with internal combustion engines, guns and the like, comprising spaced assembling heads, one having an inlet opening, leading into a central distributing chamber, and spaced undulating blades between the assembling heads, the said blades radiating from and longitudinally disposed relatively to the longitudinal axis of the silencer, and said blades forming, between their inner terminals, ports to the initial distributing chamber and, between their outer terminals, to a common space the undulations forming alternately expansion chambers and nozzles.

3. A silencer adapted for use with internal combustion engines, guns and the like, comprising spaced heads, one having an inlet opening leading into a central distributing chamber, a plurality of undulating blades radiating from and longitudinally disposed relatively to the distributing chamber, and means for spacing the blades to provide passages leading from the distributing chamber to the atmosphere the undulations forming alternately expansion chambers and nozzles.

4. A silencer adapted for use with internal combustion engines, guns and the like, comprising spaced heads one having an inlet opening, leading into a central distributing chamber, a plurality of undulating blades radiating from and longitudinally disposed relatively to the distributing chamber and shaped to form expansion chambers between said blades, and openings between the blades for the gases initially received in the distributing chamber the undulations forming alternately expansion chambers and nozzles.

5. A silencer adapted for use with internal combustion engines, guns and the like, comprising spaced heads, one having an inlet nozzle, leading into a central distributing chamber, undulating blades radiating from and longitudinally disposed relatively to said chamber, and openings between the blades connecting the chamber with the atmosphere, the undulations forming alternately expansion chambers and nozzles.

6. A silencer adapted for use with internal combustion engines, guns and the like comprising spaced heads, a central distributing chamber, inlet means for connecting said distributing chamber with an engine exhaust or a gun muzzle, and a plurality of undulating blades, radiating from and longitudinally disposed relatively to said chamber, leading out from said chamber and forming progressively larger sinuous passages therebetween, for the exhaust gases from the distributing chamber, to the atmosphere.

7. A silencer adapted for use with internal combustion engines, guns and the like, comprising a pair of spaced heads, one having an inlet opening leading into a central distributing chamber surrounded by a plurality of undulating blades radiating from and longitudinally disposed relatively to the distributing chamber said blades being shaped to form expansion chambers between themselves, means on the blades whereby their interspace is maintained, and said blades clamped between the heads.

8. A silencer adapted for use with internal combustion engines, guns and the like, comprising a pair of heads, one having an inlet diverging nozzle connecting with a central distributing chamber surrounded by a plurality of undulating blades clamped between the heads, and progressively larger passages, formed between the blades, leading out from the central distributing chamber to the atmosphere.

9. A silencer adapted for use with internal combustion engines, and the like, comprising a pair of spaced heads having, on their inner faces, a single annular depression with resilient gasket therein, and, on one of the heads, an inlet opening leading into a central distributing chamber surrounded by a plurality of spaced undulating blades radiating from and longitudinally disposed relatively to said distributing chamber, said blades having their undulated edges in contact with both aforesaid gaskets, means on the heads to maintain the blades outer terminals on the same periphery, and bolts, passing through apertures in the heads, to clamp the blades therebetween.

10. A silencer adapted for use with internal combustion engines, guns and the like, comprising spaced heads, one having an inlet opening leading to a central distributing chamber surrounded by a plurality of undulating blades radiating from and longitudinally disposed relatively to the distributing chamber, openings between the undulating blades, the said blades being shaped and positioned to form a plurality of expansion chambers therebetween of increasing volume as the distance from the distributing chamber increases, and ports leading from chamber to chamber, each one of the successive ports, between every two adjacent undulating blades, increasing in area as it approaches the circumference of the silencer.

11. A silencer adapted for use with internal combustion engines, guns and the like, comprising spaced heads, one having an inlet opening leading into a central distributing chamber surrounded by a plurality of radial undulating blades, a series of expansion chambers formed between every two adjacent blades, a series of contracting-diverging nozzles connecting every chamber in each series of expansion chambers with the adjacent chamber, the said undulating blades forming at both their inner and their outer radial terminals with well-rounded orifices serving respectively as initial and terminals ports.

12. A silencer adapted for use with internal combustion engines, guns and the like, comprising spaced heads, one having an inlet opening, leading into a central distributing chamber surrounded by a plurality of radial undulating blades forming between themselves gradual expansion chambers, said undulating blades having, at both their radial tips, longitudinal rolls and, at the points of curvature of said blades, radially disposed curvated heads formed thereon.

13. A silencer adapted for use with internal combustion engines, guns and the like, comprising a pair of spaced heads one having an inlet opening leading into a central distributing chamber which is surrounded by the inner radial ends of a plurality of radial undulating blades, the interspaces between said blades forming alternately expanding and contracting expansion chambers and ports, said blades clamped between the heads which have, on their outer faces, radial and circular fins, and apertures through which pass assembling bolts.

14. A silencer adapted for use with internal combustion engines, guns and the like, comprising a pair of spaced heads having, on their outer surfaces, radial and circular fins, and, on their inner faces, a single annular depression with a gasket therein, one of the heads having an inlet diverging nozzle leading into a central distributing chamber surrounded by the inner radial ends of a set of radial undulating blades, the interspaces between themselves forming alternating expanding and contracting expansion chambers and ports, and, interposed between said inlet head and one of the longitudinal ends of the blades set, an annular diaphragm having, at its center, an opening leading from inlet head nozzle to the distributing chamber, said diaphragm having, on both faces, single annular depressions with gaskets therein, one of the said faces in contact with the inner face of the inlet head and the other face in contact with one of the longitudinal ends of the blades set, the other end of the said blades set being in contact with inner face of rear head, and assembling bolts, passing through apertures in the heads, clamping together inlet head, diaphragm, blades and rear head.

15. A silencer adapted for use with internal combustion engines, guns and the like, comprising a pair of spaced assembling heads, one having an inlet opening leading into a central distributing chamber surrounded by the inner radial ends of a plurality of radial undulating blades, the interspace between every two of said blades forming alternately expanding and contracting expansion chambers and ports, said blades clamped between the two heads, the rear assembling head having, on its inner face, a single annular depression with a gasket therein and a central portion formed with a depression, said rear head having radial and circular fins formed thereon.

16. A silencer adapted for use with internal combustion engines, guns and the like, comprising a pair of heads, one having an inlet opening leading into a longitudinally disposed central distributing chamber surrounded by a plurality of undulating blades clamped between the heads, said heads and blades forming a series of progressively larger sinuous outlet passages between the central expansion chamber and the outer circumference of the silencer.

17. A silencer adapted for use with internal combustion engines, guns and the like, comprising a pair of heads, one having an inlet opening leading into a longitudinally disposed central distributing chamber surrounded by a plurality of undulating blades clamped between the heads, said blades and heads forming the central distributing chamber and a series of progressively larger sinuous outlet passages between the central chamber and the outer circumference of the silencer.

18. A silencer adapted for use with internal combustion engines, guns and the like, comprising a pair of heads, one having an inlet opening leading into a longitudinally disposed central distributing chamber surrounded by a plurality of undulating blades clamped between the heads, said blades and heads forming the central distributing chamber and a series of progressively larger sinuous outlet passages between the central chamber and the outer circumference of silencer, and said outlet passages divided by the undulations into several separate series of expansion chambers.

19. A silencer adapted for use with internal combustion engines, guns and the like, comprising a pair of heads, one having an inlet opening leading into a longitudinally disposed central distributing chamber surrounded by a plurality of undulating blades clamped between the heads, said blades and heads forming the central distributing chamber, and a series of progressively larger sinuous outlet passages between the central chamber and the outer circumference of the silencer, and said outlet passages divided by the undulations into several separate series of expansion chambers, all chambers, in each series of expansion chambers, connected by a series of converging-diverging nozzles.

20. A silencer adapted for use with internal combustion engines, guns and the like, comprising a pair of heads, one having an inlet opening leading into a central chamber, a plurality of undulating members between the heads forming, with the heads, a central chamber and a series of alternately expanding and contracting passages leading from central chamber to a common annular space surrounding the silencer.

In testimony whereof, I affix my signature.

ALFRED COMBAZ.